(12) United States Patent
Biggs

(10) Patent No.: US 7,200,129 B2
(45) Date of Patent: Apr. 3, 2007

(54) METHOD OF SIGNALING REVERSE CHANNEL INFORMATION WITH MINIMAL VOICE/DATA DELAY

(75) Inventor: Robert A. Biggs, Evanston, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/799,035

(22) Filed: Mar. 12, 2004

(65) Prior Publication Data

US 2005/0201352 A1   Sep. 15, 2005

(51) Int. Cl.
*H04J 3/00* (2006.01)
*H04J 3/12* (2006.01)

(52) U.S. Cl. .................. 370/336; 370/345; 370/522

(58) Field of Classification Search ........ 370/336–337, 370/345–347, 350, 496, 498, 503, 522
See application file for complete search history.

(56) References Cited

U.S. PATENT DOCUMENTS 5,459,727 A * 10/1995 Vannucci ............... 370/332
5,465,253 A * 11/1995 Rahnema ............... 370/349
5,818,825 A * 10/1998 Corrigan et al. ........... 370/329
6,421,540 B1 * 7/2002 Gilhousen et al. ......... 455/458
2003/0211847 A1 * 11/2003 Jang et al. ................ 455/434

* cited by examiner

*Primary Examiner*—Kevin C. Harper
(74) *Attorney, Agent, or Firm*—Terri S. Hughes; Indira Saladi; Valeria M. Davis

(57) ABSTRACT

In a time division multiple access system, a subscriber listens to an assigned channel (300) and an alternate channel (302) until a location of reverse channel signaling is determined for the assigned channel. The subscriber also obtains a fixed periodic rate (304) for the reverse channel signaling. Based on the fixed periodic rate, the subscriber selectively listens to the alternate channel to receive reverse channel signaling while transmitting information on the assigned channel. The base repeater, however, selects the fixed periodic rate for reverse channel signaling and transmits the reverse channel signaling at the fixed periodic rate to the transmitting subscriber. If the base repeater receives a burst belonging to a superframe and determines that any burst in the superframe will collide with the reverse channel signaling, the base repeater buffers any received burst in the superframe and transmits the buffered bursts at a subsequent time.

10 Claims, 3 Drawing Sheets

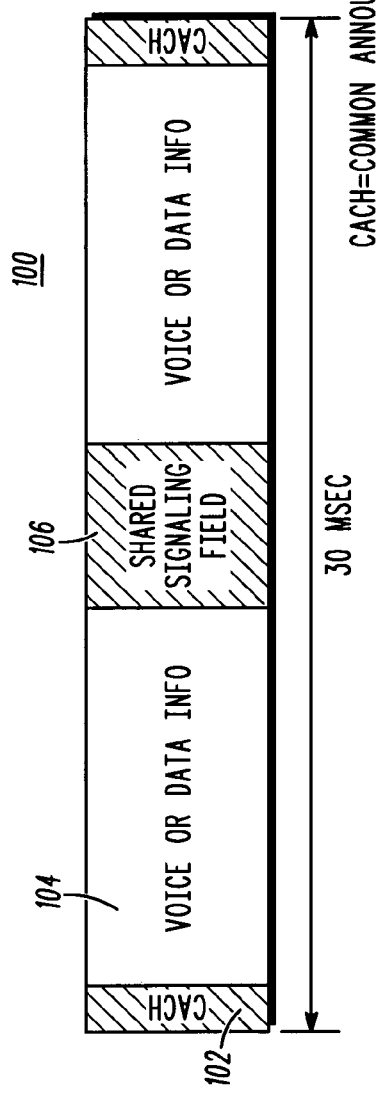
FIG. 1 —PRIOR ART—
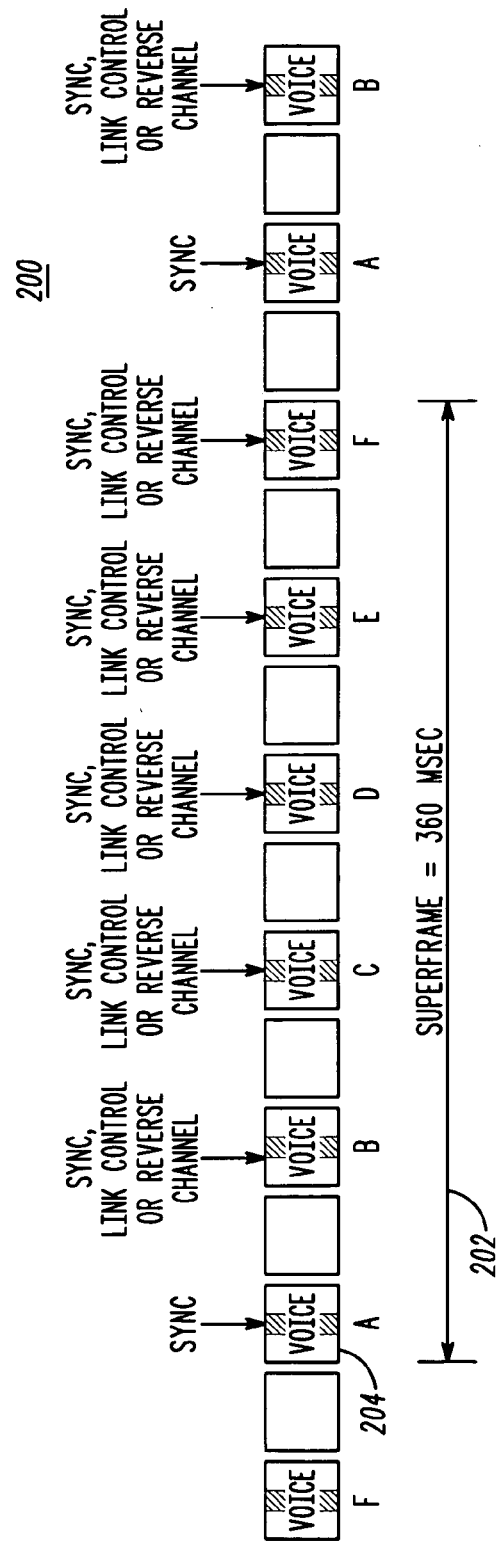
FIG. 2 —PRIOR ART—

METHOD OF SIGNALING REVERSE CHANNEL INFORMATION WITH MINIMAL VOICE/DATA DELAY

FIELD OF THE INVENTION

The present invention relates generally to a method of signaling reverse channel information to a transmitter with minimal voice/data delay.

BACKGROUND OF THE INVENTION

Time Division Multiple Access (TDMA) systems have the ability to selectively send signaling from a base repeater to a transmitting subscriber to enable features such as power control and transmitter disable. The mechanism to signal the transmitting subscriber is via the air interface protocol. The air interface protocol divides a slot into 100 into three main components as illustrated in FIG. 1. The first component 102 carries control information common to both channels on an outbound path called the common announcement channel (CACH). The second component 104 carries the voice or data payload in the slot 100. The third component 106 carries signaling information (e.g., synchronization and embedded signaling) for the receiving subscribers.

The ability for subscribers to receive while transmitting may be handled by one of three ways in a TDMA system. First, the subscriber radio may radio frequency (RF) duplex meaning that it may transmit and receive on different frequencies simultaneously. This adds substantial cost to the subscriber. Secondly, the subscriber may use time division duplex with two different clocks to allow for very fast switching between a transmit and receive frequency. This too adds the cost of a second frequency generator to the subscriber. Finally, a subscriber may be produced with only one frequency generation unit and still be allowed to switch between frequencies in a time division method but a slower rate than that afforded by a subscriber with two frequency generation units. It is this lowest cost method with which the present invention is concerned.

The channel that sends the signaling to a subscriber while it is transmitting is called the reverse channel. It can readily be seen that the reverse channel signaling must be located in the shared signaling field of the slot. This means that the reverse channel signaling must share bandwidth with synchronization and other signaling (e.g., link control) for the receivers as illustrated in FIG. 2. For example, the other signaling may comprise an indication of the current talk-group or identification of the transmitting party.

Thus, there exists a need to share bandwidth of the shared signaling field between the reverse channel and other signaling for the receivers, while minimizing impact on audio/data delay and minimizing resource loading on the subscriber.

BRIEF DESCRIPTION OF THE FIGURES

A preferred embodiment of the invention is now described, by way of example only, with reference to the accompanying figures in which:

FIG. 1 (prior art) illustrates a general slot structure in a TDMA system;

FIG. 2 (prior art) illustrates a voice superframe in the TDMA system of FIG. 1;

DETAILED DESCRIPTION OF THE PREFERRED EMBODIMENT

Figure 3:
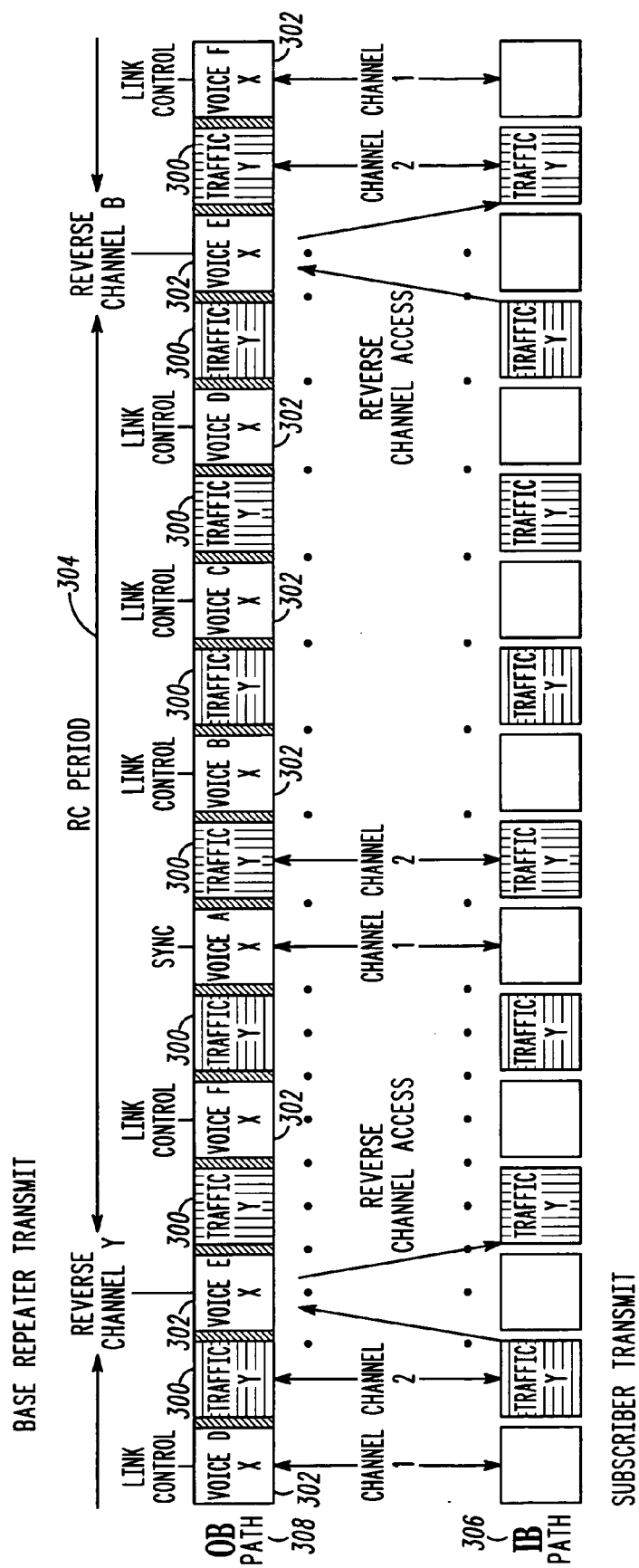
FIG. 3 illustrates an example of timing and access of reverse channel signaling in an aligned TDMA system in accordance with the present invention.

The present invention guarantees signaling bandwidth to enable a base repeater (i.e., base station, fixed end, or the like) to signal a transmitting subscriber while the transmitting subscriber is in a TDMA mode while providing minimal disruption to real-time voice and/or data communications. The present invention shares the bandwidth in the shared signaling field with synchronization, embedded signaling and reverse channel signaling; embedded signaling is designed to go to receivers of a call, whereas reverse channel signaling is designed to go to transmitters of the call. Appropriate sharing of the bandwidth is accomplished by first selecting a fixed reverse channel periodic rate and subsequently allowing the base repeater to delay transmissions, if necessary, to allow the reverse channel periodicity to remain constant. Once the subscriber synchronizes to the reverse channel, there will be little ambiguity on whether or not to process the embedded field as reverse channel signaling. Let us now refer to the figures to describe the present invention in greater detail. It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

Reverse channel signaling utilizes a shared signaling field on the outbound channel to provide reverse channel information to the transmitter while supporting two simultaneous voice/data calls. The reverse channel signaling can be used for features such as transmitter disable and power control. On the outbound path in an aligned TDMA system, the reverse channel signaling is carried on the alternate time slot to that of the transmitting subscriber. In other words, in an aligned TDMA system, the channels on the inbound path are aligned in time with the corresponding channels on the outbound path. In an aligned TDMA system, the transmitting subscriber receives its reverse channel signaling from the alternate channel (i.e., transmit information on channel 1 and receive the reverse channel signaling on channel 2). In an offset TDMA system, however, the channels on the inbound path are not aligned in time to the corresponding channels on the outbound path. In the offset TDMA system, the transmitting subscriber receives its reverse channel signaling from the same channel (i.e., transmit information and receive the reverse channel signaling on channel 1).

FIG. 2 illustrates a voice superframe 200 comprising a set of voice bursts A through F. Typically, multiple superframes are continually transmitted to convey a talk spurt longer than a voice superframe period (in this example, 360 ms) 202. It is important to note that the preferred embodiment of the present invention requires that voice burst A 204 contains synchronization. In other words, the shared signaling carried in the first burst of every superframe must be synchronization. The shared signaling carried in voice bursts B through F may be synchronization, embedded signaling (e.g., link control) or reverse channel signaling.

FIG. 3 illustrates an example of the timing and access of reverse channel signaling in an aligned TDMA system. The bursts in outbound channel 2 300, which carry the traffic for call "Y", contain synchronization or embedded link control data as dictated by the content of call Y except for every 6th burst which carries the reverse channel information for the transmitter of call "X". The subscribers receiving call "Y" listen to outbound channel 1 302 for their traffic and embedded signaling information. This arrangement allows the transmitter for call Y to receive reverse channel information without interrupting its transmission as shown in the diagram. It should be noted that traffic X and traffic Y are completely asynchronous to reverse channel Y, meaning that bursts A through F occur with no regard of reverse channel Y since they do not collide. In this example, the reverse channel signaling occurs every 360 ms or every sixth frame. It is ideal to fix the reverse channel signaling periodicity 304 to the same length as the voice superframe length to prevent any chance of the synchronization and the reverse channel signaling from colliding even in an infinitely long transmission. It should also be noted that FIG. 3 illustrates traffic transmitted from the subscriber on the inbound path 306 is repeated on the corresponding outbound path 308 some number of slots later (e.g., 1 slot).

In operation, the subscriber is assigned to channel 1 on a two-slot aligned TDMA system. Prior to transmitting, the subscriber listens to both channels 300, 302 on the outbound path 308 to gain initial synchronization and determine the position and periodicity 304 of the reverse channel signaling for its assigned channel. Once the subscriber determines the position of the reverse channel signaling on the alternate channel of the outbound path 308, the subscriber no longer has to listen to the outbound path 308 unless it wants to receive revere channel signaling information. Thus, when the subscriber begins transmitting, it knows the times in which it needs to listen to the outbound path 308 to receive reverse channel signaling information. As such, the present invention preserves resources at the subscriber since the subscriber no longer has to continually listen to the alternate channel on the outbound path 308. The optimal method in which the subscriber transmits bursts and still receive reverse channel signaling information is to know the location of the reverse channel signaling in the alternate channel.

Figure 4:
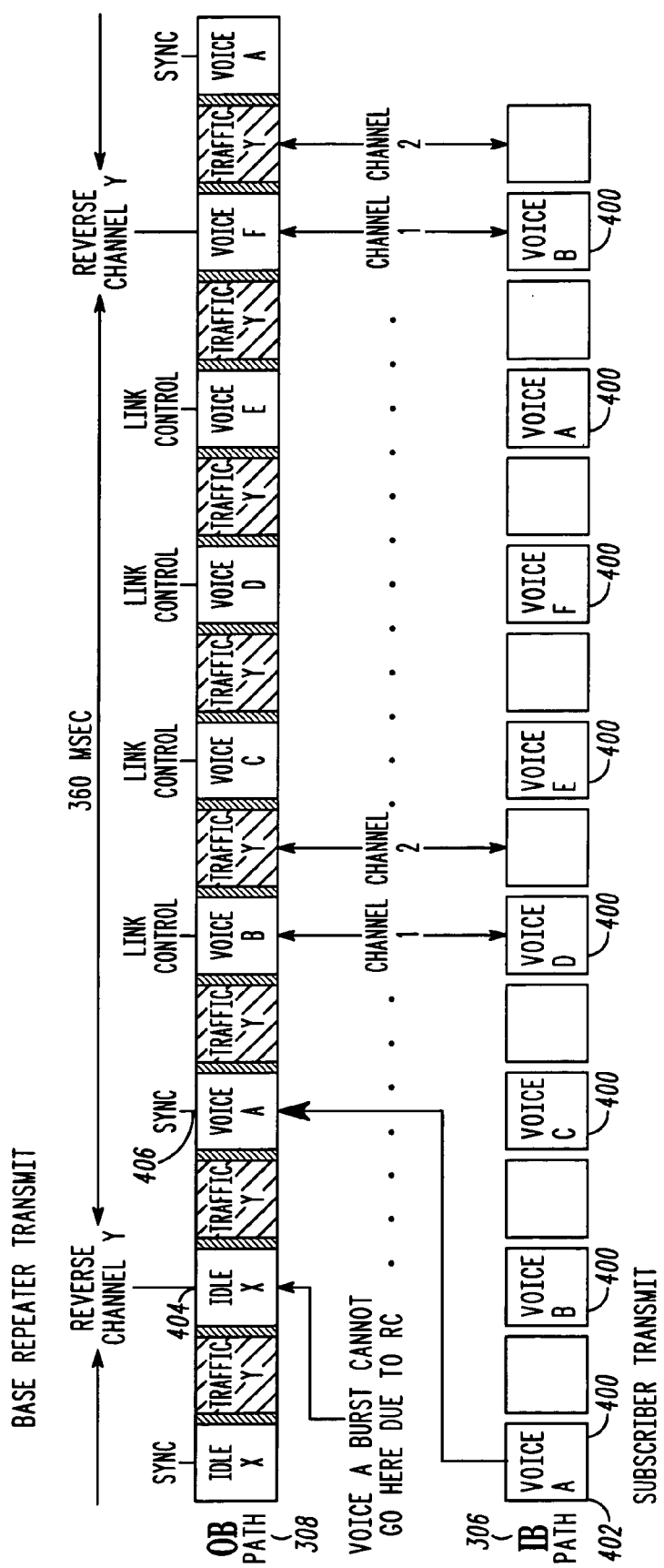
FIG. 4 illustrates the example of FIG. 3 where the base repeater avoids a potential collision between synchronization and reverse channel signaling in the shared signaling field in accordance with the present invention.

FIG. 4 is an extension of FIG. 3 illustrating an example of the base repeater avoiding a potential collision between synchronization and reverse channel signaling in the shared signaling field. In this example, the base repeater has selected and fixed the periodicity of the reverse channel signaling in the shared signaling field a priori on the outbound path 308 for the subscriber transmitting on inbound channel 1 400. The subscriber begins transmission of a voice superframe inbound to the base repeater. Upon receipt of the first burst of the superframe (e.g., voice burst A) 402, however, the base repeater determines that if it was to attempt to repeat voice burst A 402 at the first available opportunity, the synchronization and reverse channel signaling will collide in the shared signaling field 404 on outbound channel 1 302. As such, the base repeater must delay repeating the voice burst by buffering the voice burst 402 and transmitting the voice burst 402 at a subsequent time (in this example, one frame later 406) to avoid the collision of the synchronization carried by voice burst A 402 and reverse channel signaling in the shared signaling field.

In operation, the inbound subscriber transmission shown in FIG. 4 is for traffic A and begins transmitting with voice burst A. When the base repeater receives voice burst A, in order to try to repeat it in the next available slot, discovers that reverse channel Y is scheduled for that particular slot. Because voice burst A must contain synchronization, the base repeater cannot put voice burst A in this particular slot, and buffers voice burst A by one frame. As a result, the synchronization and reverse channel signaling will not collide in the shared signaling field.

Alternatively, the subscriber could know where the reverse channel signaling was going to occur and delay its initial transmission of the superframe. This alternative, however, would require the subscriber on channel 1 to look for reverse channel signaling on channel 2, which it would add unwanted complexity.

While synchronization of the reverse channel position between channel 1 and channel 2 is not required, if there is a known timing relationship between the two channels on the outbound path can help a receiver determine the periodic rate of the reverse channel signaling faster and more reliably. It is recommended that the reverse channel signaling is offset half of a superframe (e.g., three bursts) between the two channels, however, this offset is not necessary.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

I claim:

1. In a time division multiple access (TDMA) system, a method comprising the steps:
   at a subscriber:
   listening to an assigned channel and an alternate channel;
   performing the step of listening until a location of reverse channel signaling is determined for the assigned channel;
   obtaining a fixed periodic rate for reverse channel signaling;
   transmitting information on the assigned channel; and
   based on the fixed periodic rate, selectively listening to the alternate channel to receive reverse channel signaling.

2. The method of claim 1 wherein the step of obtaining comprises retrieving the fixed periodic rate from memory, wherein the fixed periodic rate is programmed into memory a priori.

3. The method of claim 1 further comprising:
   at a base repeater;
   selecting a fixed periodic rate for reverse channel signaling;
   receiving a burst, wherein the burst belongs to a superframe, and the superframe comprises a plurality of bursts;
   determining that at least one burst in the superframe will collide with reverse channel signaling;
   buffering the received burst; and
   transmitting the buffered burst at a subsequent time.

4. The method of claim 3 wherein the burst is a voice burst.

5. The method of claim 3 wherein the burst is a data burst.

6. The method of claim 3 wherein the step of selecting is performed dynamically.

7. The method of claim 3 wherein the step of selecting comprises retrieving the fixed periodic rate from memory, and wherein the fixed periodic rate is programmed into memory a priori.

8. The method or claim 3 wherein the step of transmitting comprises delaying the buffered burst by one frame.

9. In a time division multiple access (TDMA) system, a method comprising the steps:
   selecting a fixed periodic rate for reverse channel signaling for a first channel; and
   transmitting reverse channel signaling at the fixed periodic rate to a transmitting subscriber assigned to the first channel,
   wherein the TDMA system comprises an aligned slotting structure, and the reverse channel signaling is transmitted in a shared signaling field on a second channel on an outbound path while the second channel supports a first call and the first channel supports a second call.

10. The method of claim 9 wherein the shared signaling field carries one of reverse channel signaling, synchronization and embedded signaling.

* * * * *